US006409789B1

United States Patent
Gilbert

(12) 
(10) Patent No.: US 6,409,789 B1
(45) Date of Patent: Jun. 25, 2002

(54) ORGANIC BIOSOLID WASTE TREATMENT PROCESS FOR RESOURCE TRANSFORMATION, REGENERATION, AND UTILIZATION

(76) Inventor: R. Gene Gilbert, 7338 S. Yukon Ct., Littleton, CO (US) 80128

( * ) Notice: Subject to any disclaimer, the term of this patent is extended or adjusted under 35 U.S.C. 154(b) by 0 days.

(21) Appl. No.: 09/499,544

(22) Filed: Feb. 7, 2000

(51) Int. Cl.$^7$ .................................................. C05F 3/00
(52) U.S. Cl. ............................................... 71/15; 71/31
(58) Field of Search ........................................ 71/15, 31

(56) References Cited

U.S. PATENT DOCUMENTS

| | | | | |
|---|---|---|---|---|
| 2,734,803 A | | 2/1956 | Ruskin ....................... 23/259.1 |
| 3,961,096 A | | 6/1976 | Emanuel ..................... 426/644 |
| 4,034,078 A | | 7/1977 | Van Horn .................... 424/76 |
| 4,050,917 A | * | 9/1977 | Varro .............................. 71/9 |
| 4,062,770 A | * | 12/1977 | Kneer .......................... 210/12 |
| 4,177,575 A | * | 12/1979 | Brooks .......................... 34/13 |
| 4,298,621 A | | 11/1981 | Samis et al. ................. 426/635 |
| 4,349,572 A | | 9/1982 | Larson et al. ............... 426/335 |
| 4,909,825 A | | 3/1990 | Eigner ............................. 71/9 |
| 5,017,562 A | * | 5/1991 | Holmes et al. ............... 514/26 |
| 5,021,247 A | | 6/1991 | Moore ......................... 426/69 |
| 5,240,490 A | | 8/1993 | Moore ........................... 71/17 |
| 5,252,542 A | | 10/1993 | Allan ......................... 504/323 |
| 5,411,567 A | | 5/1995 | Ueotani et al. .................. 71/9 |
| 5,730,772 A | | 3/1998 | Staples ............................ 71/9 |
| 5,876,479 A | * | 3/1999 | Hedgpeth, IV ................ 71/11 |
| 5,878,479 A | | 3/1999 | Hedgpeth, IV ................ 71/11 |
| 5,897,785 A | | 4/1999 | Billings ...................... 210/734 |
| 5,914,040 A | * | 6/1999 | Pescher et al. ............. 210/638 |
| 6,027,603 A | * | 2/2000 | Evans et al. ................. 119/171 |
| 6,197,081 B1 | * | 3/2001 | Schmidt .......................... 71/1 |

OTHER PUBLICATIONS

Perez–Rey, R. et al, *Ozone Inactivation of Biologically–Risky Wastewaters*, pp. 499–509, 1995.

* cited by examiner

*Primary Examiner*—Chhaya D. Sayala
(74) *Attorney, Agent, or Firm*—Emery L. Tracy

(57) ABSTRACT

A resource transformation and regeneration process for creating beneficial organic nutrient-rich products from raw organic biosolid waste material is provided. The process comprises initially mixing the raw organic biosolid waste material to a substantially uniform size, oxidizing and transforming the raw organic biosolid waste material, secondarily mixing the oxidized and transformed organic biosolid waste material, and drying the oxidized and regenerated organic biomeal material, producing a beneficial nutrient-rich product for plants and animals.

19 Claims, 1 Drawing Sheet

FLOW CHART

ORGANIC BIOSOLID TREATMENT PROCESS

ORGANIC BIOSOLID WASTE TREATMENT PROCESS FOR RESOURCE TRANSFORMATION, REGENERATION, AND UTILIZATION

BACKGROUND OF THE INVENTION

1. Field of the Invention

This invention relates generally to a process for treating organic biosolid waste material and, more particularly, it relates to a transformation and regeneration process for treating organic biosolid waste material which integrates biological, chemical, and physical treatment agents under controlled conditions with timely scheduled treatment processes thereby creating a substantially odorless, organic biomeal, prescription formulated, slow-release, environmentally safe, nutrient-rich organic product for plants and animals.

2. Description of the Prior Art

As a result of expansion and industrialization of concentrated animal feeding operations, great concern has been directed toward a resulting quantitative increase in animal biosolid waste, especially poultry litter and hog manure. Both poultry litter and hog manure emit malodors and are known to cause severe environmental pollution.

Attempts have been made in the past to treat and deodorize these animal manures and other sources of organic biosolid waste materials as described in Ueotani et al, U.S. Pat. No. 5,411,567. The Ueotani et al patent describes fermentation products which are composed essentially of poultry litter components. The fermentation products are derived from reacting poultry litter materials with concentrated sulfuric acid and calcium silicate. The fermentation products result from the reaction mixture by the use of a selected class of bacteria. Unfortunately, however, using sulfuric acid in the reaction causes other potential health and environmental problems which should be avoided in a commercial fermentation product.

Additionally, in the past, other attempts have been made to treat organic biosolid waste materials, as follows:

The Varro, U.S. Pat. No. 4,050,917, describes a composting process which is an extremely long and highly odorous process. The end result of the Varro patent's process has not proven to be a highly acceptable environmental product for use in agricultural and urban communities due to the mentioned notably high odor content and remarkable lack of nutrient supply.

The Brooks, U.S. Pat. No. 4,177,575, describes a drying and pelletizing process for raw organic waste materials, such as hog manure and poultry litter animal biosolids waste material. The Brooks patent merely describes a composting and drying processes which does not produce a final product that is fully accepted by urban and agricultural communities due, once again, to extreme odor and minimal nutrient supply.

The Staples, U.S. Pat. No. 5,730,772, describes a drying process for turning poultry litter into fertilizers. Once again, the odors associated with a drying process such as described in the Staples patent is unacceptable in urban and agricultural communities.

The Hedgpeth, U.S. Pat. No. 5,876,479, merely describes a composition and method of manufacturing a liquid humic acid based soil enhancer and not a fertilizer or nutrient source for animals and plants.

Unfortunately, the above listed references have described one or more of the following treatment processes: composting, digesting, fermenting and/or drying (only), which have produced products with only limited nutrient value. These produced products with the limited nutrient value will only continue to contribute to soil, water, and air pollution and environmental concerns.

Accordingly, there exists a definite need for a developed unique process that treats organic biosolid waste material producing a highly beneficial and environmentally safe products. Additionally, a need exists for a developed biosolid waste treatment process which integrates biological, chemical, and physical treatment agents under controlled conditions, with timely scheduled treatment processes, thereby creating an organic biomeal, substantially odorless, environmentally safe, nutrient-rich product for plants and animals.

SUMMARY

The present invention is a resource regeneration process that creates a transformed organic biomeal product from raw organic biosolids, such as poultry litter and hog manure. The method comprises initially mixing and conditioning the raw poultry litter to a uniform size, treating the raw poultry litter with transforming reaction agents, secondarily mixing the oxidized regenerated poultry litter, and drying the oxidized regenerated poultry litter into a processed organic biomeal.

In an embodiment of the present invention, the process further comprises determining and controlling the moisture content of the initially mixed raw poultry litter. Preferably, the moisture content of the initially mixed raw poultry litter from the poultry house is conditional and controlled between approximately fifteen (15%) percent and twenty-five (25%) percent moisture. Furthermore, preferably, the method further comprises adding water to the raw poultry litter to achieve desired controlled moisture content for treatment between twenty-six (26%) percent and thirty-two (32%) percent moisture.

In another embodiment of the present invention, the process further comprises initially mixing the raw poultry litter from approximately ten (10) minutes to fifteen (15) minutes while introducing sequentially transforming reaction agents that biologically and chemically oxidize the raw poultry litter.

In still another embodiment of the present invention, the regeneration process further comprises determining the moisture content of the oxidized regenerated poultry litter. Preferably, the moisture content of the oxidized regenerated poultry litter is determined and controlled between approximately twenty-six (26%) percent and approximately thirty-two (32%) percent.

In yet another embodiment of the present invention, the process further comprises bringing the pH of the oxidized regenerated poultry litter to between approximately 6.2 and approximately 7.0.

In still yet another embodiment of the present invention, the process further comprises adding an acid chelated copper ($Cu^{++}$) reagent such as manufactured under the trademark pHL 104, manufactured by pH Solutions, Ltd., Jupiter, Fla.

In another embodiment of the present invention, the process further comprises adding a binding agent that binds ammonia gas and other organic odorous substances. Preferably, the binding ammonia and odor control agent is a yucca plant extract, such as manufactured under the trademark DE-ODORASE, manufactured by Alltech, Inc., Nicholsville, Ky.

In yet another embodiment of the present invention, the process further comprises drying the secondarily mixed regenerated poultry litter to a moisture content of between approximately seven (7%) percent and approximately nine (9%) percent. Preferably, the secondarily mixed regenerated poultry litter is dried for approximately fifteen (15) minutes.

In an embodiment of the present invention, the raw organic biosolid waste material is selected from the group consisting of poultry litter, beef, dairy, and/or hog manure; as well as other sources of organic biosolid waste from animal and plant processing plants.

In another embodiment of the present invention, the product further comprises addition of an acid chelated copper ($Cu^{++}$) reagent wherein the oxidized regenerated poultry litter has a pH of approximately 6.2 to approximately 7.0.

In still another embodiment of the present invention, the product further comprises the addition of a yucca plant extract as a binding and odor control agent.

In yet another embodiment of the present invention, the regenerated poultry litter has a uniformity of various sizes as desired for various biomeal nutrient formulations for plant and animal feed.

In still yet another embodiment of the present invention, the regenerating process comprises a combination of sequential and timed addition of biological and chemical transforming oxidizing agents at a critical controlled mass of each which drives the oxidation process to completion in approximately twelve (12) to fifteen (15) minutes.

DETAILED DESCRIPTION OF THE PREFERRED EMBODIMENTS

Figure 1:
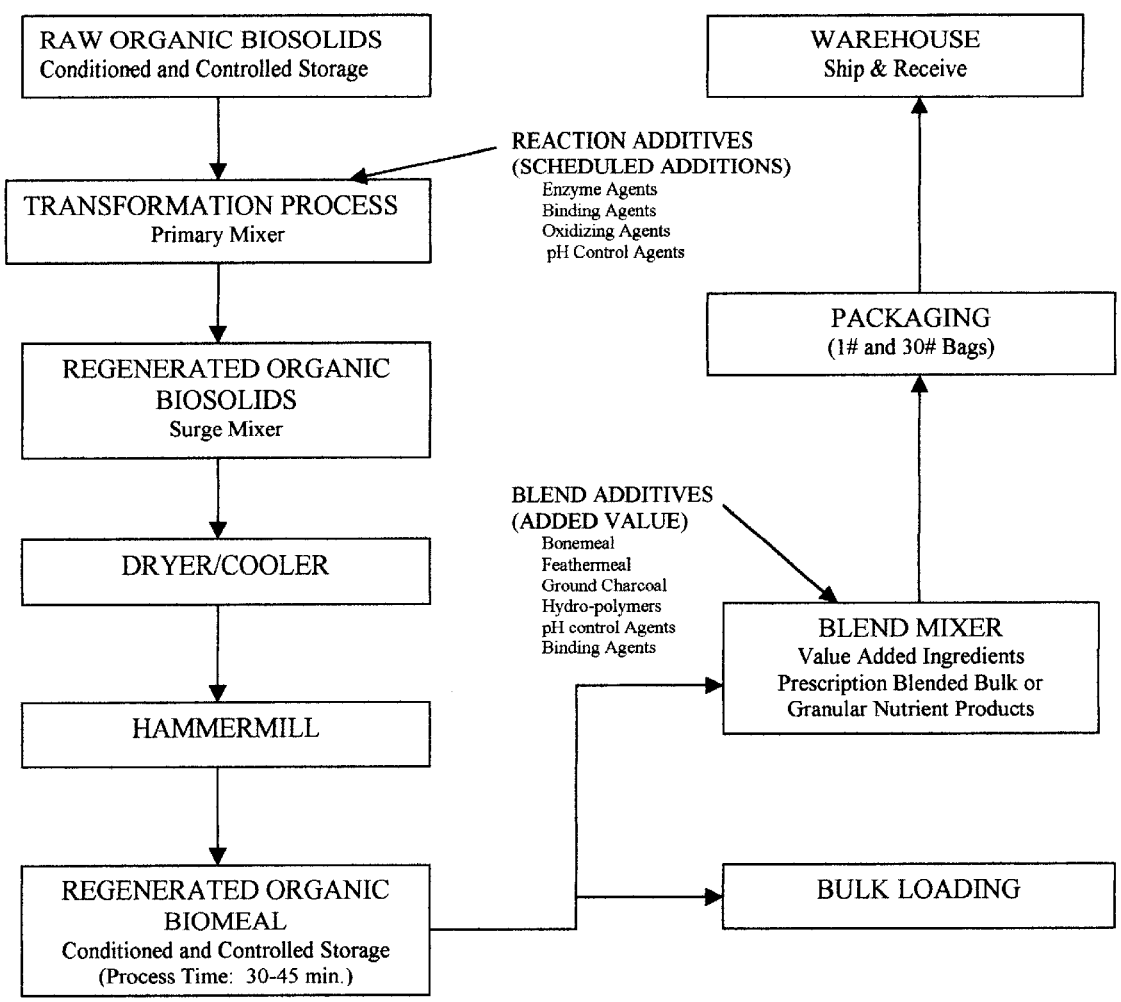
FIG. 1 is a flow diagram illustrating the transformation, regeneration, and utilization processes for treating raw organic biosolid waste material, constructed in accordance with the present invention, developed for processing raw poultry litter into a regenerated nutrient-rich organic biomeal for plant and animal feed.

As illustrated in FIG. 1, the present invention is an organic biosolid waste treatment process, indicated generally at 10, for treating primarily biosolid organic animal waste, including, but not limited to, raw poultry litter, hog, beef and/or dairy waste. The organic biosolid waste treatment process 10 of the present invention treats organic waste material by integrating biological, chemical, and physical treatment reaction agents using two (2) modes of operation (batch or continuous), under controlled conditions thereby creating a substantially odorless, prescription formulated, slow-release nutrient-rich/regenerated organic biomeal for plant and animal feed.

Resource Transformation and Regeneration Process

Raw Poultry Litter Organic Biomass Storage

The raw poultry litter organic biomass is stored for at least five (5) days in an environmental and weather-proof facility to substantially reduce migratory dust and foreign debris contamination. Preferably, the facility is constructed from a concrete material since the acids in the raw organic waste material can cause severe corrosion of metal and metal alloys. It is within the scope of the present invention that the raw poultry litter storage facility be constructed from any non-leaching material including, but not limited to, concrete, plastic, etc.

The raw poultry litter organic biomass is received into the mixing facility at approximately fifteen (15%) percent to twenty (20%) percent moisture content with product uniformity of various sizes, e.g., crumble, clumps, and debris, of the raw organic waste material. The uniformity of the raw organic waste material product size can be manipulated into a homogenous form by using a hammermill, for instance. After the raw poultry litter organic biomass is properly conditioned for moisture content and uniform particle size, it is held in storage ready for the primary mixer transforming process.

Primary Mixer

Upon the analysis given of the raw poultry litter, the primary mixing process begins as follows:

1. Raw poultry litter organic biomass is placed in the primary mixer;
2. The moisture content of the raw poultry litter organic biomass is determined;
3. Preferably, the moisture content of the raw poultry litter organic biomass is between twenty-six (26%) percent and thirty-two (32%) percent. Water can be added while mixing the raw poultry litter organic biomass to achieve the desired moisture content for treatment;
4. The raw organic biosolid waste material is continually mixed while various reaction agents are added in a sequentially and critically timed schedule until the transformation process is completed which typically occurs in approximately ten (10) to fifteen (15) minutes thus creating a mixed regenerated poultry litter organic biosolid material;
5. The moisture content of the mixed regenerated poultry litter organic biosolid material is determined; and
6. The regenerated poultry litter organic biosolid material is dried to a moisture content between approximately seven (7%) percent and nine (9%) percent—total time is approximately fifteen (15) minutes.

In the primary mixing, oxidation of the raw poultry litter occurs by means of adding liquid form reaction oxidizing agents at critical mass concentrated levels with a mixing time for each of approximately two (2) minutes in length. The combination of the blended organic biosolid material and the added biological and chemical oxidizers creates an oxidized regenerated poultry litter organic biosolid material. At such time, a chemical reaction occurs, e.g., oxidation occurs in the mixed organic biosolid material and the temperature of the oxidized organic biosolid material rises from the ambient temperature to approximately ninety-five (95° F.) degrees Fahrenheit. Moisture content of the oxidized organic waste product is critical at this stage of the process because of the critical mass of oxidizing agents to be added. Water can be added to bring the moisture level to approximately twenty-six (26%) percent to thirty-two (32%) percent of the total organic biosolid analyses. The regenerating oxidizing reactions and temperature rise occurring after the addition of the critical mass of biological and chemical oxidizing agents occurs in no more than approximately three (3) minutes. During this time, the oxidizing poultry litter organic biosolid material must be mixed thoroughly by mechanical means at approximately two (2) minutes to three (3) minutes intervals to insure proper mixing and complete oxidation of the raw poultry litter.

Another step in the regenerating process is to stop the enzymes' reaction, e.g., total time mixing no more than five (5) minutes, by adding acid chelated copper ($Cu^{++}$) reagent (a patented formulated product called pHL 104 manufactured by pH Solutions, Jupiter, Fla.), of very low doses to bring the pH of the regenerated poultry litter organic biosolid material between approximately 6.2 to approximately 7.0. A last and final addition of yucca plant extract is added to the regenerated poultry litter organic biosolid material as a binding and odor control agent. Total time of primary mixing is approximately ten (10) minutes to fifteen (15) minutes.

Surge Mixer

The primary mixed regenerated poultry litter organic biosolid material is held in storage with a secondary surge mixing device and maintained in motion by mechanical means. The surge mixing device allows oxygen to be continuously incorporated into the primary mixed regenerated poultry litter organic biosolid material prior to introduction into the drying/cooling apparatus.

Dryer/Cooler

Preferably, the drying is accomplished by drum/rotary type dryers. Care must be used on the temperature of the dryers, so as not to scorch the product since nitrogen depletion starts at two-hundred and ten (210° F.) degrees Fahrenheit. However, the product must reach at least two-hundred (200° F.) degrees Fahrenheit and be held for at least approximately five (5) minutes to ensure proper sterilization and killing of pathogenic organisms and weed seeds. The regenerated organic biosolid material must be dried down to a moisture content between approximately seven (7%) percent and nine (9%) percent moisture content to ensure proper processing.

Cooling can be obtained by using the same mechanics as in drying, without the added heat. Ambient air is sufficient to ensure proper cooling.

Hammermill

Next, the regenerated poultry litter organic biosolid material is introduced into a hammermill to create a nutrient-rich, organic biomeal product suitable for plants and animals. The dried organic biomeal product is free flowing and when using a dust control agent is virtually dust free and can be bagged or bulk.

Storage

Any type of bulk storage bins can be used in the storage of the final organic biomeal product. If the final organic biomeal product is bagged, it can be stored by any warehouse means.

Resource Utilization Process

Bulk Loading

After storage of the regenerated poultry litter organic biomeal product, the product can be bulk loaded onto trucks or the like for shipment to a desired end use, i.e., plant and animal feed.

Blend Mixer

To achieve the desired nutrient-rich blend, value added ingredients can be added to the regenerated poultry litter organic biomeal product and mixed in a blend mixer. For instance, bonemeal, feathermeal, ground charcoal, hydropolymers, pH control agents, binding agents, etc., can be added in the desired amounts and quantities to product a prescription delivered organic.biomeal product.

Packaging

From the blend mixer, the mixed regenerated poultry litter organic biomeal product can be packaged in various sized bags or containers for subsequent warehouse storage.

Warehouse

The package mixed regenerated poultry litter organic biomeal product can then be stored in a warehouse until shipment to a desired end user.

Benefits of the Organic Biosolid Regeneration Process

The organic biosolid waste treatment process of the present invention converts raw poultry litter and other organic biosolid waste material into a beneficial organic biomeal product. The organic biosolids regeneration process integrates biological, chemical, and physical treatment agents under controlled conditions creating an organic biomeal that is almost odorless, environmentally safe, slow-release organic nutrient-rich product for plants and animals. The resulting benefits of the organic biosolids regeneration process of the present invention and the regenerated organic biomeal products are as follows:

Poultry Farmers

1) Provides excellent adaptive management options for waste/resource recovery and utilization of poultry litter into natural organic products.

2) Provides for implementation of nutrient management planning, not previously possible, for crop production and environmental resource protection.

3) Provides for elimination of the long term negative environmental impact and effects of disposing of raw poultry litter by spreading it untreated on limited acreages of land resources.

Poultry Producers and Processors

1) Provides for development and implementation of watershed management practices that will protect and improve the quality of surface and ground water resources.

2) Provides for development and integration of ecosystem-based management with public relations programs to enhance the quality and health of the environment and its natural resources: soil, air, and water.

Urban and Rural Community Populations

1) Provides for regeneration of poultry waste into a unique natural organic fertilizer for use on lawn, turf, and horticultural/ornamental house plants.

2) Provides for the enhancement of air and water quality and environmental health.

3) Provides for an acceptable level of healthy poultry production that sustains the economic base and employment opportunities for the urban and rural community populations.

Poultry Organic Fertilizer Processors and Producers

1) Provides for regenerating and transforming smelly raw organic poultry litter into a pathogen-free, slow nutrient-release, organic fertilizer product.

2) Provides for the production and marketing of natural organic fertilizers containing no synthetic chemicals, harmful pathogens or toxic substances.

3) Provides for conservation of natural resources with redistribution and utilization of a previously raw organic waste, as an environmentally safe organic fertilizer product.

4) Provides for complete resource recovery of raw poultry waste in a nutrient rich natural organic fertilizer for use in nursery, forestry, horticultural, and agronomic plant production systems.

5) Provides employment opportunities and enhances the sustainable economic base of the agricultural and urban communities.

6) Provides an organic slow-release fertilizer that improves soil quality, tilth, and does not run-off or leach into water resources.

7) Provides a value added organic fertilizer product that increases biodiversity in the soil ecosystem with increased population of soil microbes, earthworms. and natural biocontrol agents that enhance plant root growth and health, while reducing plant diseases and other pest problems.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A resource regeneration process for creating an organic biomeal nutrient-rich product from poultry litter, the process comprising:

initially mixing conditioning the poultry litter to a substantially uniform size;

oxidizing the poultry litter;

secondarily mixing the oxidized and transformed poultry litter; and drying the oxidized and regenerated poultry litter thereby completing the resource regeneration process for creating an organic biomeal nutrient-rich product from poultry litter.

2. The process of claim 1 further comprising determining the moisture content of the initially mixed poultry litter.

3. The process of claim 2 wherein the moisture content of the initially mixed poultry litter is between approximately fifteen (15%) percent and twenty-five (25%) percent.

4. The process of claim 3 further comprising adding water to the initially mixed poultry litter to achieve a moisture content between approximately twenty-six (26%) percent and approximately thirty-two (32%).

5. The process of claim 1 further comprising initially mixing the poultry litter for between approximately ten (10) minutes and fifteen (15) minutes.

6. The process of claim 1 further comprising determining the moisture content of the oxidized and transformed poultry litter.

7. The process of claim 6 wherein the moisture content of the oxidized and regenerated poultry litter is between approximately twenty-six (26) percent and approximately thirty-two (32) percent.

8. The process of claim 1 further comprising bringing the pH of the oxidized and regenerated poultry litter to between approximately 6.2 and approximately 7.0.

9. The process of claim 8 further comprising adding an acid chelated copper ($Cu^{++}$) reagent.

10. The process of claim 1 further comprising adding a binding and odor control agent.

11. The process of claim 10 wherein the binding and odor control agent is a yucca plant extract.

12. The process of claim 1 further comprising drying the secondarily mixed regenerated poultry litter to a moisture content of between approximately seven (7%) percent and approximately nine (9%) percent.

13. The process of claim 12 wherein the secondarily mixed regenerated poultry litter is dried for approximately fifteen (15) minute.

14. The process of claim 1 further comprising introducing the dried regenerated poultry litter into a blend mixer for producing, with predetermined additives, a specific prescription plant/crop fertilizer blend.

15. The process of claim 14 further comprising introducing value-added additives selected from the group consisting of bonemeal, feathermeal, ground charcoal, hydropolymers, pH control agents, and binding agents.

16. An organic biomeal nutrient-rich fertilizer material produced by the method of claim 1, comprising:

poultry litter having an ambient temperature;

an oxidizer reacting with the poultry litter creating an oxidized transformed organic poultry litter material thereby raising the temperature of the treated organic poultry litter material from the ambient temperature to a temperature of approximately ninety-five (95° F.) degrees Fahrenheit; and wherein the oxidized transformed organic poultry litter material has a moisture content of between approximately seven (7) percent to approximately nine (9) percent.

17. The product of claim 16 further comprising an acid chelated copper ($Cu^{++}$) reagent, wherein the oxidized and regenerated organic poultry litter material has a pH of approximately 6.2 to approximately 7.0.

18. The product of claim 16 further comprising yucca plant extract as a binding and odor control agent.

19. The product of claim 16 wherein the raw organic poultry litter material has a free flowing uniform composition.

* * * * *